United States Patent
Schlemmer et al.

(10) Patent No.: US 10,526,901 B2
(45) Date of Patent: Jan. 7, 2020

(54) TURBOMACHINE BLADE ASSEMBLY

(71) Applicant: MTU Aero Engines AG, Munich (DE)

(72) Inventors: Markus Schlemmer, Mainburg/Sandelzhausen (DE); Gerhard-Heinz Roesele, Aichach (DE); Andreas Hartung, Munich (DE)

(73) Assignee: MTU Aero Engines AG, Munich (DE)

( * ) Notice: Subject to any disclaimer, the term of this patent is extended or adjusted under 35 U.S.C. 154(b) by 131 days.

(21) Appl. No.: 15/458,257

(22) Filed: Mar. 14, 2017

(65) Prior Publication Data
US 2017/0335695 A1  Nov. 23, 2017

(30) Foreign Application Priority Data
Mar. 16, 2016 (DE) .................. 10 2016 204 281

(51) Int. Cl.
| | | |
|---|---|---|
| *F01D 5/26* | (2006.01) | |
| *F01D 5/16* | (2006.01) | |
| *F01D 5/14* | (2006.01) | |
| *F01D 5/30* | (2006.01) | |

(52) U.S. Cl.
CPC .............. *F01D 5/26* (2013.01); *F01D 5/147* (2013.01); *F01D 5/16* (2013.01); *F01D 5/3061* (2013.01); *F05D 2220/32* (2013.01); *F05D 2240/30* (2013.01); *F05D 2250/221* (2013.01); *F05D 2250/241* (2013.01); *F05D 2260/96* (2013.01)

(58) Field of Classification Search
CPC .......... F01D 5/26; F01D 5/147; F01D 5/3061; F01D 5/16; F01D 5/22; F05D 2250/021; F05D 2250/32; F05D 2250/241; F05D 2260/96; F05D 2260/962; F05D 2260/963; F05D 2260/964; F05D 2240/30; F02D 25/246
See application file for complete search history.

(56) References Cited

U.S. PATENT DOCUMENTS

| | | | | |
|---|---|---|---|---|
| 1,856,786 A | * | 5/1932 | Rice | F01D 5/10 416/145 |
| 2,349,187 A | * | 5/1944 | Meyer | F01D 5/16 188/322.5 |
| 4,897,021 A | * | 1/1990 | Chaplin | F01D 5/22 267/160 |
| 8,087,881 B1 | * | 1/2012 | Cardoso, III | F01D 5/26 415/119 |
| 8,157,507 B1 | * | 4/2012 | Coffin | F01D 5/26 415/119 |
| 2013/0280083 A1 | | 10/2013 | Hartung | |
| 2016/0010462 A1 | | 1/2016 | Stiehler | |

(Continued)

FOREIGN PATENT DOCUMENTS

| | | |
|---|---|---|
| DE | 102014223231 | 6/2016 |
| WO | WO2012095067 | 7/2012 |

*Primary Examiner* — George C Jin
(74) *Attorney, Agent, or Firm* — Davidson, Davidson & Kappel, LLC

(57) ABSTRACT

A turbomachine blade assembly including a turbomachine blade (1), in particular for a gas turbine, and at least one tuning element container including a housing (10) attached to the turbomachine blade and an insert (20) disposed in a recess (11) of this housing. A wall (20; 21) of the insert spaces apart two first cavities (31), which each accommodate at least one tuning element (40) provided for impacting contact with the housing (10) and the insert (20).

16 Claims, 2 Drawing Sheets

(56) References Cited

U.S. PATENT DOCUMENTS

2016/0138401 A1    5/2016  Hartung et al.
2016/0146041 A1*   5/2016  Hartung .................... F01D 5/10
                                                      415/119

* cited by examiner

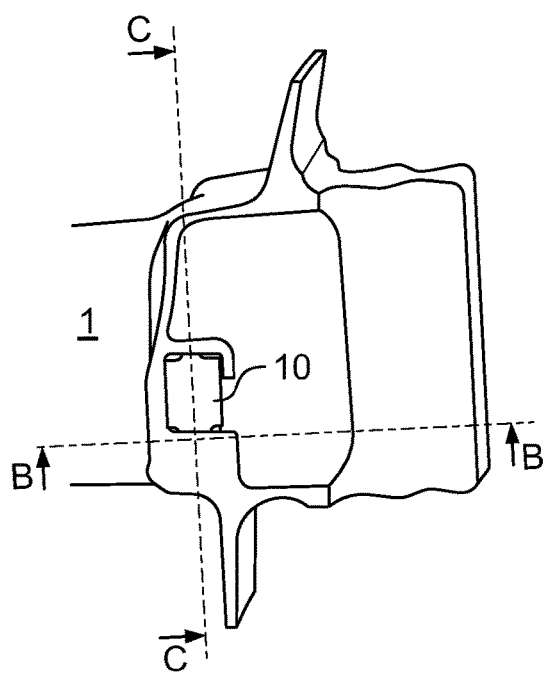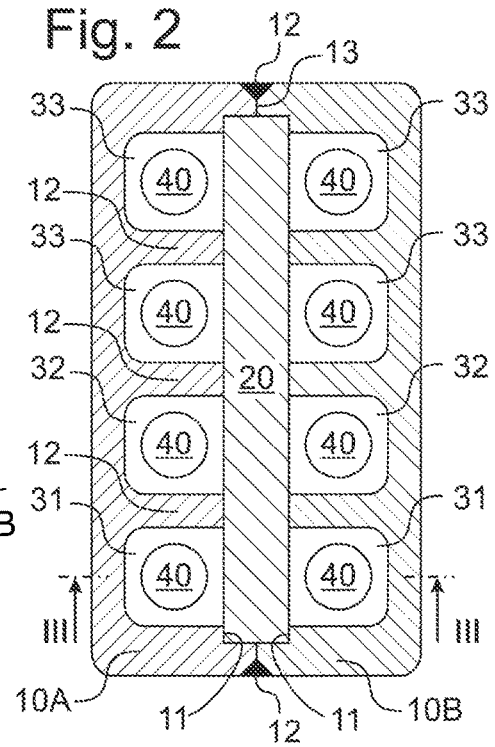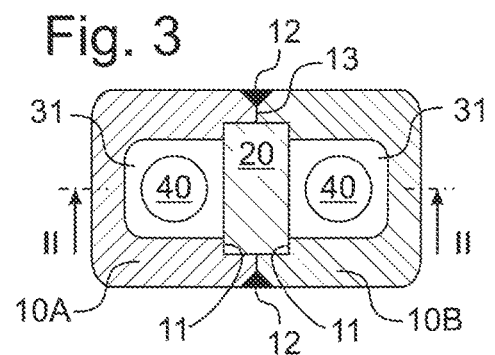

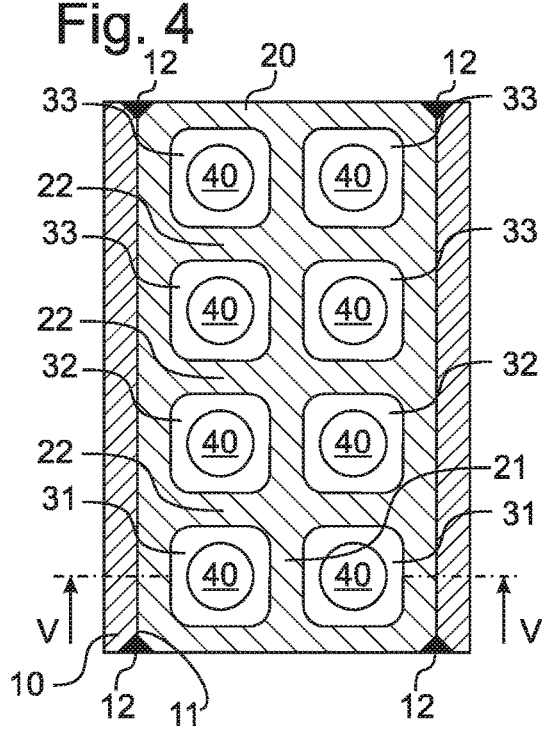
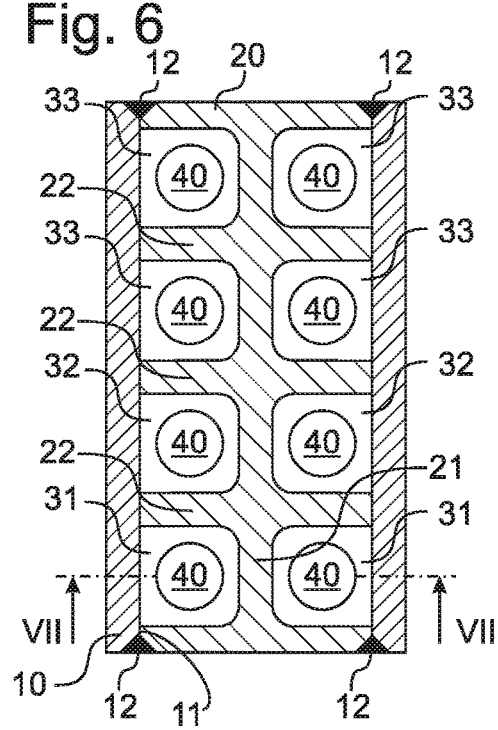
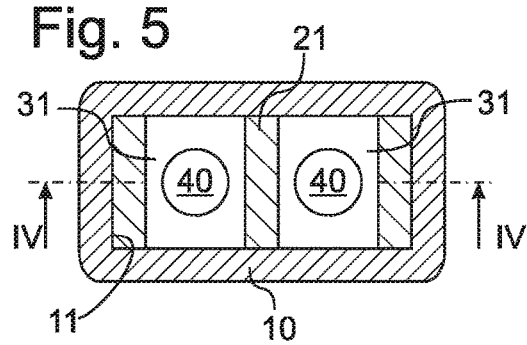
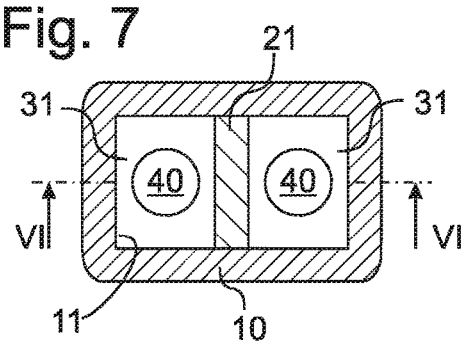

TURBOMACHINE BLADE ASSEMBLY

The present invention relates to a turbomachine blade assembly, a turbomachine, in particular a gas turbine, including the turbomachine blade assembly, as well as a method for manufacturing the turbomachine blade assembly.

BACKGROUND

The Applicant's WO 2012/095067 A1, which is also made reference to herein and the contents of which are hereby expressly incorporated into the present disclosure in their entirety, describes a turbomachine blade assembly including a turbomachine blade and a multi-part cylindrical turning element guide housing having a plurality of cavities, each accommodating a turning element for impacting contact with the tuning element guide housing, the tuning element guide housing being disposed in a recess of the turbomachine blade.

SUMMARY OF THE INVENTION

It is an object of an embodiment of the present invention to improve a turbomachine.

In an embodiment of the present invention, a turbomachine blade assembly includes a turbomachine blade and one or more tuning element containers. The turbomachine blade may in particular be a rotor blade or a stator vane of a compressor or turbine stage of a gas turbine. In particular, the present invention may be used to advantage in connection therewith.

In an embodiment, the tuning element container includes a housing which is attached to the turbomachine blade, in particular by an interlocking or friction fit and/or by a material-to-material bond, in particular non-destructively detachably or in a manner that does not permit non-destructive detachment and/or in particular at a blade root, a blade tip or an airfoil of the turbomachine blade. This manner of attachment and/or positioning can advantageously improve assembly of the turbomachine (blade) and/or the operating characteristics thereof.

In an embodiment of the present invention, the tuning element container has an insert which is completely or partially disposed or received in a recess of this housing. This can advantageously improve in particular the support and/or attachment of the insert and/or an impact behavior and thus the operating characteristics of the turbomachine (blade). In a refinement, shear forces in one or more welds of the tuning element container can also be reduced in this manner.

In an embodiment of the present invention, a wall of the insert spaces apart or separates two cavities, which each accommodate at least one tuning element provided for impacting contact with the housing and the insert and capable of repeatedly contacting the same, and which are hereinafter referred to as first cavities without limiting generality. In other words, in an embodiment, the wall of the insert is disposed between the two first cavities, so that one side or surface of the wall forms a wall surface of one first cavity, and an opposite side or surface of the wall forms a wall surface of the other first cavity. In an embodiment, the insert may be formed by this, in particular flat, wall or include further walls, webs, or the like.

Surprisingly, it has been found that an impact behavior of the tuning elements disposed in the cavities, and thus the operating characteristics of the turbomachine (blade), can be advantageously improved if two cavities are separated or partially formed or defined by (opposite sides or surfaces of) a wall of the insert, which is disposed in the recess of the housing mounted on the turbomachine blade.

In an embodiment, the tuning element container has two further cavities, which each accommodate at least one tuning element provided for impacting contact with the housing and the insert and capable of repeatedly contacting the same, and which are hereinafter referred to as second cavities without limiting generality, and which are also spaced apart or separated by a wall, in particular the same wall, of the insert. In other words, in an embodiment, this wall of the insert is disposed between the two second cavities, so that one side or surface of the wall forms a wall surface of one second cavity, and an opposite side or surface of the wall forms a wall surface of the other second cavity.

In an embodiment, the tuning element container may have still further cavities, which each accommodate at least one tuning element provided for impacting contact with the housing and the insert and capable of repeatedly contacting the same, and which are also spaced apart or separated by a wall, in particular the same wall, of the insert. In other words, in an embodiment, this wall of the insert is disposed between two respective further cavities, so that one side or surface of the wall forms a wall surface of one further cavity, and an opposite side or surface of the wall forms a wall surface of the other further cavity.

In an embodiment, exactly one (i.e., only one) turning element is disposed in each of the one or more cavities. This makes it possible to advantageously improve an impact behavior and thus the operating characteristics of the turbomachine (blade).

The tuning elements disposed in the cavities and provided and configured for impacting contact with the housing and the insert make it possible to advantageously improve vibration characteristics and thus the operating characteristics of the turbomachine (blade), in particular to detune one or more natural frequencies. In this regard and with respect to further details of this concept, reference is additionally made to WO 2012/095067 A1.

In an embodiment, one or more of the tuning elements each have a spherical contour and/or each have a mass of at least 0.01 g and/or no more than 0.075 g. In an embodiment, additionally or alternatively, a minimum play of one or more of the tuning elements in the respective cavity accommodating it is at least 0.01 mm, in particular at least 0.1 mm, and a maximum play of one or more of the tuning elements in the respective cavity accommodating it is no more than 1.5 mm, in particular no more than 1.2 mm This makes it possible to advantageously improve an impact behavior and thus the operating characteristics of the turbomachine (blade).

In an embodiment, the housing, the insert and/or one or more of the tuning elements may include metal, in particular be composed thereof. This makes it possible to advantageously improve an impact behavior and thus the operating characteristics of the turbomachine (blade).

In an embodiment, at least one of the first cavities and one of the second cavities are spaced apart or separated by a wall of the insert. In an embodiment, additionally or alternatively, at least one of the first cavities and one of the second cavities may be spaced apart or separated by a wall of the housing. This makes it possible to advantageously improve an impact behavior and thus the operating characteristics of the turbomachine (blade), respectively.

In an embodiment, the, in particular symmetrically shaped or configured, housing is formed as a single part; i.e., is of a one-piece design. This makes it possible in particular to increase stability and thereby advantageously improve an impact behavior and thus the operating characteristics of the turbomachine (blade).

In another embodiment, the, in particular symmetrically shaped or configured, housing is formed of two or more, in particular identical, parts; i.e., is of a two-piece or multi-piece design. This makes it possible in particular to advantageously improve assembly.

In an embodiment, the, in particular symmetrically shaped or configured, insert is formed as a single part; i.e., is of a one-piece design. This makes it possible in particular to increase stability and thereby advantageously improve an impact behavior and thus the operating characteristics of the turbomachine (blade).

In an embodiment, at least two parts of the housing are joined together by a material-to-material bond, in particular by welding. This makes it possible in particular to increase stability and thereby advantageously improve an impact behavior and thus the operating characteristics of the turbomachine (blade). In an embodiment, additionally or alternatively, shear forces in one or more welds of the tuning element container can be reduced, in particular by the manner in which the insert is disposed or received in the recess of the housing.

In an embodiment, additionally or alternatively the housing and the insert are joined together by a material-to-material bond, in particular by welding. This makes it possible in particular to increase stability and thereby advantageously improve an impact behavior and thus the operating characteristics of the turbomachine (blade). In an embodiment, additionally or alternatively, shear forces in one or more welds of the tuning element container can be reduced, in particular by the manner in which the insert is disposed or received in the recess of the housing.

In particular, the at least two parts of the housing and/or the housing and the insert may be joined together by a material-to-material bond and in such a way that the cavities are sealed gas-tight from the external environment surrounding the housing; i.e., in particular, that the at least two parts of the housing and/or the housing and the insert are joined together gas-tight. This makes it possible to advantageously improve an impact behavior and thus the operating characteristics of the turbomachine (blade).

In an embodiment, end faces of two parts of the housing are joined together, and one or both of the end faces (each) have a depression in which the insert is completely or partially received and which thus defines or define the recess. This makes it possible in particular to increase stability and thereby advantageously improve an impact behavior and thus the operating characteristics of the turbomachine (blade).

In an embodiment, the housing has a recess which is open at one end (i.e., configured like a blind hole) or a recess which is open at both ends (i.e., a through-hole), in which the insert is inserted. This makes it possible in particular to increase stability and thereby advantageously improve an impact behavior and thus the operating characteristics of the turbomachine (blade). In addition or alternatively, this makes it possible to advantageously improve assembly.

In an embodiment, the housing has one or more recesses which are open at one end (i.e., configured like a blind hole) and/or one or more recesses which are open at both ends (i.e., through-holes), which each bound one of the cavities. In an embodiment, additionally or alternatively, the insert has one or more recesses which are open at one end; i.e., configured like a blind hole, and/or one or more recesses which are open at both ends (i.e., through-holes), each of the recesses bounding one of the cavities. This makes it possible in particular to advantageously improve an impact behavior and thus the operating characteristics of the turbomachine (blade). In addition or alternatively, this makes it possible to advantageously improve assembly.

In an embodiment, the housing is cuboid-shaped. This makes it possible in particular to advantageously improve an impact behavior and thus the operating characteristics of the turbomachine (blade).

In an embodiment, through-holes of the insert each have a closed periphery (i.e., cross section) or a slot. This makes it possible to reduce weight and/or to achieve an advantageous impact behavior of the tuning elements in the cavities.

In an embodiment of the present invention, in order to manufacture a turbomachine blade assembly as described herein, the tuning elements are placed into the cavities, in particular in parts of the housing or in the insert. Previously or subsequently, the insert is placed into the recess of the housing. In a refinement, then, the insert is joined to the housing and/or parts of the housing are joined together, so that the insert is fixed within the housing.

BRIEF DESCRIPTION OF THE DRAWINGS

Further advantageous embodiments of the present invention will become apparent from the dependent claims and the following description of preferred embodiments. To this end, the drawings show, partly in schematic form, in:

FIG. 1: a perspective view of a portion of a turbomachine blade assembly in accordance with an embodiment of the present invention showing a generally axial direction c-c and a generally radial direction beta-beta;

FIG. 2: a cross section through a tuning element container of the turbomachine blade assembly, taken parallel to the plane of the drawing of FIG. 1 and along line II-II in FIG. 3;

FIG. 3: a cross section through the tuning element container, taken along line III-III in FIG. 2;

FIG. 4: a cross section, corresponding to FIG. 2, through a tuning element container of a turbomachine blade assembly in accordance with another embodiment of the present invention;

FIG. 5: a cross section, corresponding to FIG. 3, through the tuning element container of FIG. 4;

FIG. 6: a cross section, corresponding to FIGS. 2, 4, through a tuning element container of a turbomachine blade assembly in accordance with another embodiment of the present invention; and FIG. 7: a cross section, corresponding to FIGS. 3, 5, through the tuning element container of FIG. 6.

DETAILED DESCRIPTION

FIG. 1 shows, in perspective view, a root-end portion of a turbomachine blade assembly according to an embodiment of the present invention. The turbomachine blade assembly includes a turbomachine blade 1 (only partially shown in FIG. 1) and a tuning element container, which is shown in FIG. 2 in a cross section taken parallel to the plane of the drawing of FIG. 1 and, in FIG. 3, in a cross section perpendicular thereto, taken along line III-III in FIG. 2.

The tuning element container includes a housing 10 which is attached to the turbomachine blade 1 and composed of two identical parts 10A, 10B, as well as an insert 20 disposed in a recess 11 of this housing. Two first cavities 31, which each accommodate a tuning element 40 provided for impacting contact with housing 10 and insert 20, are spaced apart by the insert, which, in the exemplary embodiment of FIGS. 2, 3, is formed by a flat wall 20.

The tuning element container has two second cavities 32, as well as further cavities 33, which also each accommodate a tuning element 40 provided for impacting contact with housing 10 and insert 20. The two second cavities 32, and each two of the further cavities 33, are respectively spaced apart by the insert; i.e., wall 20.

As can be seen in FIG. 2, a wall 12 of housing 10 spaces apart each one of the first cavities 31 from a respective one of the second cavities 32, each one of the second cavities 32 from a respective one of the further cavities 33, and each two of the further cavities 33 from respective ones of the further cavities 33.

End faces 13 of the two parts 10A, 10B of housing 10 are joined together gas-tight by a circumferential weld 12. Each of the end faces 13 has a depression 11, in which insert 20 is partially received, and which thus together form recess 11.

Housing 10 has blind holes which are open at one end. Each of the blind holes bounds one of the cavities 31-33 and, together with the insert or wall 20, defines one of the cavities 31-33.

Housing 10 is cuboid-shaped.

In order to manufacture the turbomachine blade assembly, initially, tuning elements 40 are placed into the blind holes in parts 10A, 10B of the housing, and then insert 20 is placed into recess 11. Subsequently, the two parts 10A, 10B are welded together.

FIGS. 4, 5 show cross sections, corresponding to FIGS. 2, 3, through a tuning element container of a turbomachine blade assembly in accordance with another embodiment of the present invention. Corresponding features are identified by identical reference numerals, so that reference is made to the above description and only the differences will be discussed below.

In the embodiment of FIGS. 4, 5, insert 20 is inserted in a recess 11 of one-piece housing 10, which recess is open at both ends. Insert 20 is welded gas-tight to housing 10 at both end faces (at the top and bottom in FIG. 4) by a respective circumferential weld 12.

In this embodiment, as can be seen in FIG. 4, a wall 22 of insert 20 spaces apart each one of the first cavities 31 from a respective one of the second cavities 32, each one of the second cavities 32 from a respective one of the further cavities 33, and each two of the further cavities 33 from respective ones of the further cavities 33, and a wall 21 of insert 20, which is perpendicular to wall 22, spaces apart the two first cavities 21, the two second cavities 32, and each two of the further cavities 33 from respective ones of the further cavities 33.

Insert 20 has through-holes which are open at both ends (at the top and bottom in FIG. 5). Each of the through-holes bounds one of the cavities 31-33 and, together with housing 10, defines one of the cavities 31-33.

In order to manufacture the turbomachine blade assembly of the embodiment of FIGS. 4, 5, tuning elements 40 are placed into the through-holes of insert 20, and then insert 20 is placed into recess 11 of housing 10 and welded thereto.

FIGS. 6, 7 show cross sections, corresponding to FIGS. 4, 5, through a tuning element container of a turbomachine blade assembly in accordance with another embodiment of the present invention. Corresponding features are identified by identical reference numerals, so that reference is made to the above description and only the differences will be discussed below.

Unlike the embodiment of FIGS. 4, 5, in the embodiment of FIGS. 6, 7, the through-holes of insert 20 do not have a closed periphery (i.e., cross section), but each have slot (at the right and left in FIGS. 6, 7) which, like the opposite openings at the end faces (at the top and bottom in FIG. 5 and FIG. 7), is covered or closed by housing 10. This makes it possible to reduce weight and/or to achieve a different impact behavior of tuning elements 40 in cavities 31-33.

Although exemplary embodiments have been described in the foregoing, it should be noted that many modifications are possible. It should also be appreciated that the exemplary embodiments are only examples, and are not intended to limit the scope, applicability, or configuration in any way. Rather, the foregoing detailed description provides those skilled in the art with a convenient road map for implementing at least one exemplary embodiment, it being understood that various changes may be made in the function and arrangement of elements described without departing from the scope of protection set forth in the appended claims and the legal equivalents thereof.

LIST OF REFERENCE NUMERALS 1 turbomachine blade
10 housing
10A,
10B housing part
11 recess/depression
12 weld
13 end face
20 insert
21 wall
22 wall
31 first cavity
32 second cavity
33 further cavity
40 tuning element

What is claimed is:

1. A turbomachine blade assembly comprising:
a turbomachine blade;
at least one tuning element container including a housing attached to the turbomachine blade and an insert disposed in a recess of the housing, a wall of the insert spacing apart two first cavities; and
tuning elements provided for impacting contact with the housing and the insert, the two first cavities each accommodating at least one of the tuning elements.

2. The turbomachine blade assembly as recited in claim 1 wherein the wall spaces apart two second cavities each accommodating at least one of the tuning elements.

3. The turbomachine blade assembly as recited in claim 2 wherein the wall or a further wall of the housing spaces apart at least one of the first cavities and one of the second cavities.

4. The turbomachine blade assembly as recited in claim 1 wherein the housing is formed as a single part or the insert is formed as a single part.

5. The turbomachine blade assembly as recited in claim 1 wherein the housing or the insert is symmetrical about an axial plane.

6. The turbomachine blade assembly as recited in claim 1 wherein at least two parts of the housing, or the housing and the insert are joined together by a material-to-material bond.

7. The turbomachine blade assembly as recited in claim 6 wherein the material-to material bond includes a weld.

8. The turbomachine blade assembly as recited in claim 1 wherein end faces of two parts of the housing are joined together, at least one of the end faces having a depression, the insert being at least partially received in the depression.

9. The turbomachine blade assembly as recited in claim 1 wherein the housing has a recess open at one or both ends, the insert being inserted in the recess.

10. The turbomachine blade assembly as recited in claim 1 wherein the housing or the insert have at least one recess open at one or both ends and bounding one of the two first cavities.

11. The turbomachine blade assembly as recited in claim 1 wherein the housing is cuboid-shaped.

12. A turbomachine comprising: at least one turbomachine blade assembly as recited in claim 1.

13. A gas turbine comprising the turbomachine blade assembly as recited in claim 12.

14. A method for manufacturing the turbomachine blade assembly as recited in claim 1, comprising placing the tuning elements into the first cavities and placing the insert into a recess of the housing.

15. The turbomachine blade assembly as recited in claim 1 wherein the housing is formed of two identical parts.

16. The turbomachine blade assembly as recited in claim 1 wherein the wall is contacted by a first of the tuning elements in one of the first two cavities, and by a second of the tuning elements in an other of the first two cavities on another side of the wall.

* * * * *